US011255675B2

(12) United States Patent
Nakamura et al.

(10) Patent No.: US 11,255,675 B2
(45) Date of Patent: Feb. 22, 2022

(54) COURSE ESTIMATING DEVICE, METHOD OF ESTIMATING COURSE, AND COURSE ESTIMATING PROGRAM

(71) Applicant: FURUNO ELECTRIC CO., LTD., Nishinomiya (JP)

(72) Inventors: Hiraku Nakamura, Osaka (JP); Hiroyuki Toda, Nishinomiya (JP); Naomi Fujisawa, Nishinomiya (JP); Akihiro Hino, Kakogawa (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 312 days.

(21) Appl. No.: 16/728,420

(22) Filed: Dec. 27, 2019

(65) Prior Publication Data

US 2020/0200539 A1 Jun. 25, 2020

Related U.S. Application Data

(63) Continuation-in-part of application No. PCT/JP2018/020513, filed on May 29, 2018.

(30) Foreign Application Priority Data

Jun. 30, 2017 (JP) ............................ JP2017-128510

(51) Int. Cl.

| | |
|---|---|
| ***G01P 3/44*** | (2006.01) |
| ***G01S 19/49*** | (2010.01) |
| ***G01C 21/16*** | (2006.01) |
| ***G01S 15/60*** | (2006.01) |
| ***G01C 21/10*** | (2006.01) |

(52) U.S. Cl.

CPC ................ *G01C 21/10* (2013.01); *G01P 3/44* (2013.01)

(58) Field of Classification Search

CPC ................................ G01C 21/10; G01P 3/44

See application file for complete search history.

(56) References Cited

FOREIGN PATENT DOCUMENTS

| | | |
|---|---|---|
| JP | H04-28636 B2 | 5/1992 |
| JP | 2006-194806 A | 7/2006 |
| JP | 2009-115514 A | 5/2009 |
| JP | 4528636 B2 | 8/2010 |
| JP | 2011-220727 A | 11/2011 |

(Continued)

OTHER PUBLICATIONS

International Search Report issued in PCT/JP2018/020513; dated Aug. 21, 2018.

(Continued)

*Primary Examiner* — Mathew Franklin Gordon

(74) *Attorney, Agent, or Firm* — Studebaker & Brackett PC

(57) ABSTRACT

The present disclosure is to calculate an estimated position with high precision. A course estimating device 10 includes an angular velocity calculating part 30, a horizontal ground speed calculating part 70 and an estimated position calculating part 80. The angular velocity calculating part 30 measures or calculates an angular velocity of a movable body. The horizontal ground speed calculating part 70 calculates a horizontal ground speed based on an attitude angle, a ground course, and a ground ship speed of the movable body. The estimated position calculating part 80 calculates an estimated position, based on a period of time from a current time point to an estimation time point, the horizontal ground speed, and an integration operation of the angular velocity.

20 Claims, 11 Drawing Sheets

(56) References Cited

FOREIGN PATENT DOCUMENTS

| | | | |
|---|---|---|---|
| JP | 2014-145614 | A | 8/2014 |
| WO | 93007448 | A1 | 4/1993 |

OTHER PUBLICATIONS

The extended European search report issued by the European Patent Office dated Jan. 11, 2021, which corresponds to European Patent Application No. 18825136.7-1206 and is related to U.S. Appl. No. 16/728,420; with Documents annexed to the extended European search report.

COURSE ESTIMATING DEVICE, METHOD OF ESTIMATING COURSE, AND COURSE ESTIMATING PROGRAM

CROSS-REFERENCE TO RELATED APPLICATION

This application is a U.S. National stage of international Application No. PCT/JP2018/020513 filed on May 29, 2018. This application claims priority to Japanese Patent Application No. 2017-128510 filed on Jun. 30, 2017. The entire disclosure of Japanese Patent Application No. 2017-128510 is hereby incorporated herein by reference.

TECHNICAL FIELD

The present disclosure relates to a course estimating device, a method of estimating a course, and a course estimating program, which estimate a position of a movable body.

BACKGROUND

Conventionally, various navigation devices having a function for displaying an estimated course has been devised and put in practical use. The conventional navigation devices calculate a distance by multiplying a period of time from the current time point to the estimating time point by the current speed. The conventional navigation devices calculate an estimated position by adding the calculated distance to the current position. Then, the conventional navigation devices calculate the estimated course by successively repeating the calculation of the estimated position.

As such a navigation device, a navigation device described in Patent Document 1 (a ship display device) calculates the estimated position further using the double integral of acceleration.

REFERENCE DOCUMENT OF CONVENTIONAL ART

Patent Document

Patent Document 1: JP4528636B

However, in the navigation device of Patent Document 1, since a value obtained by multiplying the square of time by ½ and acceleration, noise component caused by the observation error etc. of the acceleration increases. Therefore, errors of the estimated position and the estimated course increase.

Therefore, one purpose of the present disclosure is to provide a course estimating device, a method of estimating course, and a course estimating program, which calculate an estimated position with high precision.

SUMMARY

A course estimating device of the present disclosure includes a horizontal ground speed calculating part, an angular velocity calculating part and an estimated position calculating part. The horizontal ground speed calculating part calculates a horizontal ground speed based on an attitude angle, a ground course, and a ground ship speed of a movable body. The angular velocity calculating part measures or calculates an angular velocity of the movable body. The estimated position calculating part calculates an estimated position, based on a period of time from a current time point to an estimation time point, the horizontal ground speed, and an integration operation of the angular velocity when the angular velocity exceeds a turning detection threshold.

According to this configuration, the estimated position may be calculated using the integrated value of the acquired angular velocity when the movable body is turning.

According to the present disclosure, the estimated position can be calculated with high precision.

DETAILED DESCRIPTION

A course estimating device, a method of estimating a course, and a course estimating program according to a first embodiment of the present disclosure will be described with reference to the figures. Note that, although a mode in which a ship is used as a movable body is illustrated below, the configuration of the present disclosure invention is also applicable to other water-surface, underwater movable bodies, land movable bodies, or air movable bodies.

Figure 1:
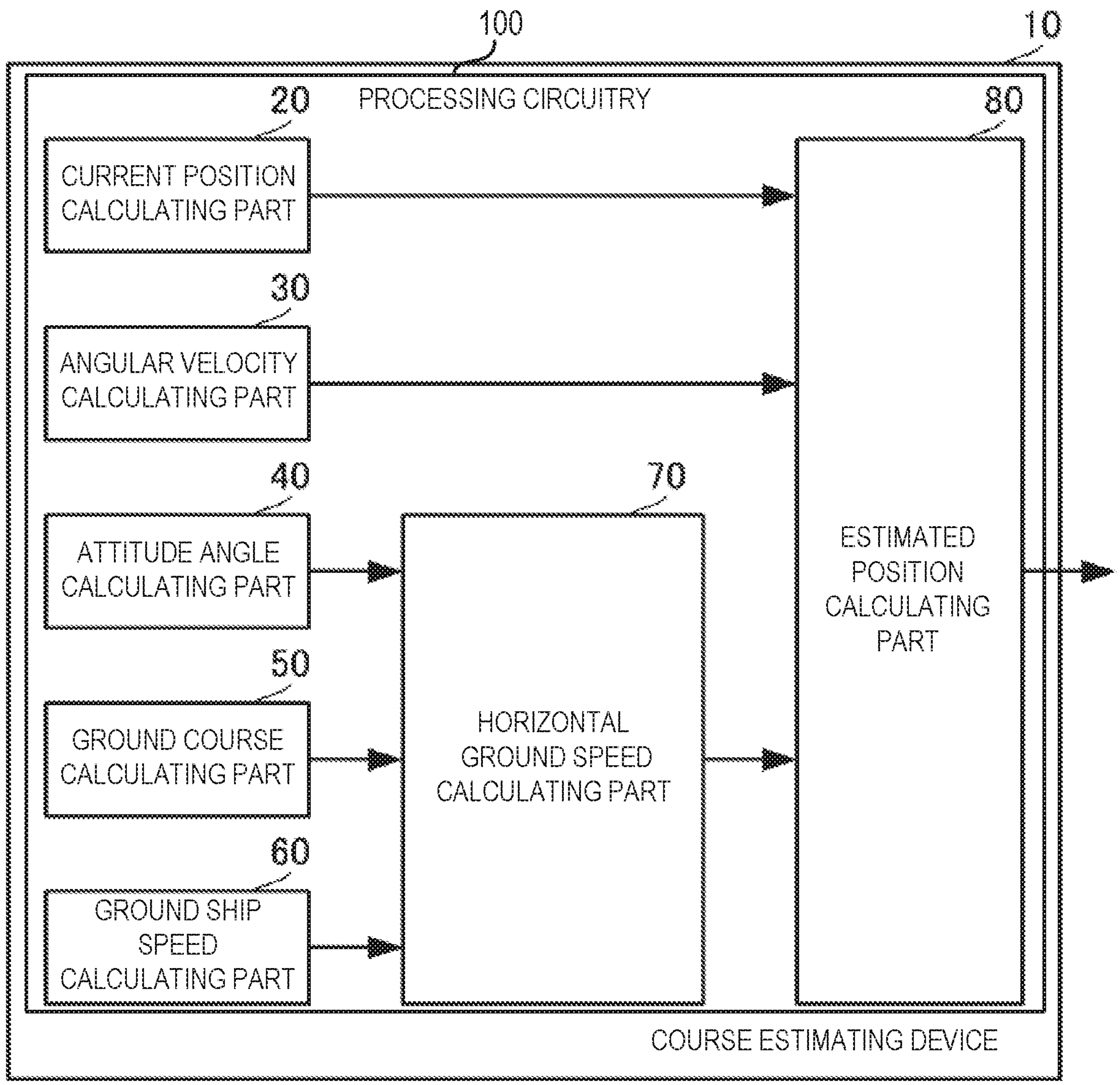
FIG. 1 is a block of a course estimating device according to a first embodiment of the present disclosure.
Figure 2:
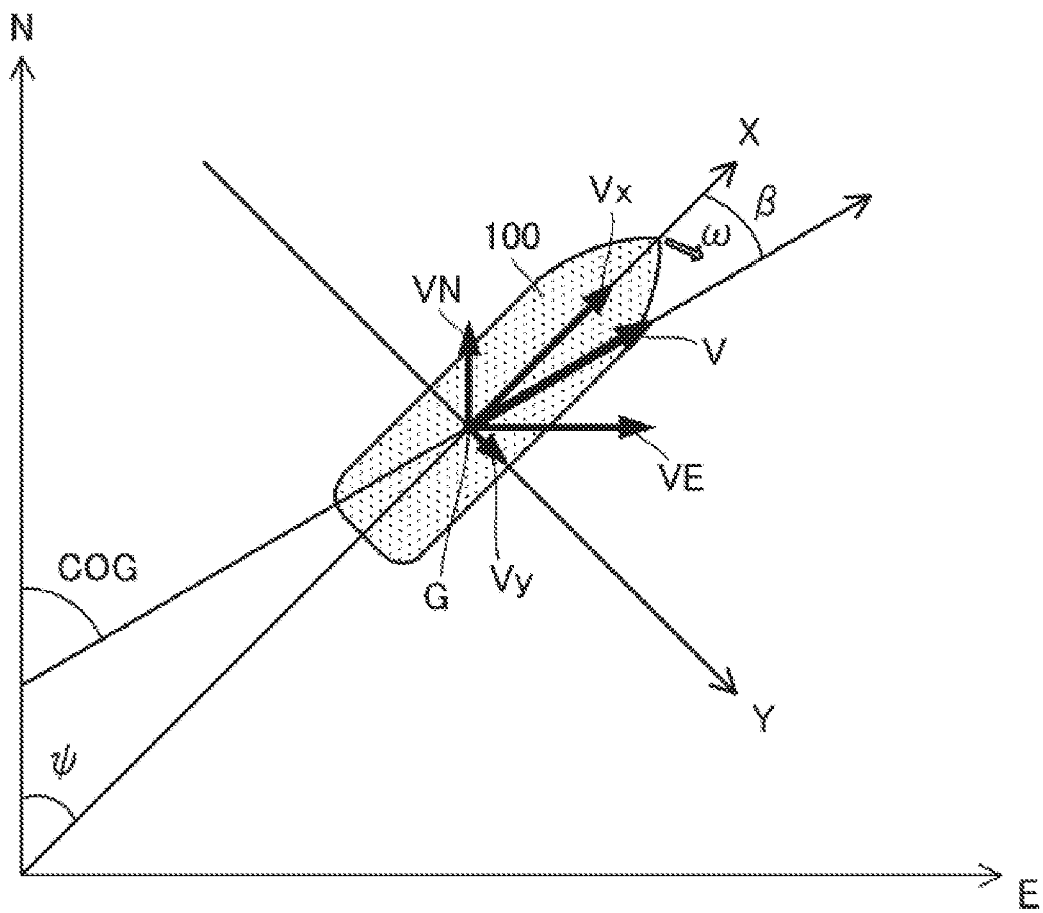
FIG. 2 is a view illustrating a concept of calculating an estimated position of the first embodiment of the present disclosure.

FIG. 1 illustrates a block of the course estimating device according to the first embodiment of the present disclosure. FIG. 2 is a view illustrating a concept of calculating an estimated position of the first embodiment of the present disclosure.

As illustrated in FIG. 1, a course estimating device 10 may include a current position calculating part 20, an angular velocity calculating part 30, an attitude angle calculating part 40, a ground course calculating part 50, a ground ship speed calculating part 60, a horizontal ground speed calculating part 70, and an estimated position calculating part 80.

The current position calculating part 20 may calculate a current position P of a movable body to which the course estimating device 10 is provided. A current position P(0) may have a latitude component Plat(0) and a longitude component Plon(0). The current position calculating part 20 may calculate a current position Pec(0) in the ECEF rectangular coordinate system, for example, by using a code pseudorange etc. of a positioning signal. The current position calculating part 20 may calculate a current position Pec(0) using the positioning signal received by at least one antenna which is mounted to a hull. The current position calculating part 20 may convert, using a coordinate conversion matrix of the ECEF rectangular coordinate system and an ENU coordinate system, the current position Pec(0) in the ECEF rectangular coordinate system into the current position P in the ENU coordinate system, and calculate the latitude component Plat(0) and the longitude component Plon(0) of the current position P. The current position calculating part 20 may output the current position P(0) to the estimated position calculating part 80.

The angular velocity calculating part 30 may calculate an angular velocity ω(t) of the hull. The angular velocity calculating part 30 is, as one example, a gyroscope sensor which is an inertia sensor, and measures and outputs the angular velocity ω(t). As another example, the angular velocity calculating part 30 may calculate the angular velocity ω using a carrier phase difference between the positioning signals. In this case, the angular velocity calculating part 30 may calculate the angular velocity ω(t) using a difference between the carrier phases received by at least two antennas disposed at different positions of the movable body. The angular velocity calculating part 30 may output the angular velocity ω(t) to the estimated position calculating part 80. By using the carrier phase, highly-accurate angular velocity can be obtained with the simple configuration.

The attitude angle calculating part 40 may calculate an attitude angle of the hull. The attitude angle may be normally comprised of a roll angle φ(t), a pitch angle θ(t), and yaw angle ψ(t). The attitude angle calculating part 40 may calculate at least the yaw angle ψ(t). The attitude angle calculating part 40 may calculate the attitude angle including at least yaw angle ψ(t) by using the angular velocity calculated by the angular velocity calculating part 30 and the measurement value or carrier phase difference of the inertia sensor. Note that the attitude angle calculating part 40 may calculate the yaw angle ψ(t) based on the angular velocity calculated by the angular velocity calculating part 30. By using the carrier phase, the highly-accurate attitude angle can be acquired with the simple configuration.

The ground course calculating part 50 may calculate a ground course COG(t) using the attitude angle etc. of the hull. The ground course calculating part 50 may output the ground course COG(t) to the horizontal ground speed calculating part 70.

The ground ship speed calculating part 60 may calculate a ground speed SOG(t) using an output etc. of a Doppler sonar. The ground ship speed calculating part 60 may output the ground speed SOG(t) to the horizontal ground speed calculating part 70.

The horizontal ground speed calculating part 70 may calculate a horizontal ground speed Vb(t) in a hull coordinate system using the following method. The horizontal ground speed Vb(t) may be a vector quantity, and is comprised of an x-direction component Vbx(t) and a y-direction component Vby(t). The x-direction may be parallel to the bow direction of a ship 100 as illustrated in FIG. 2, and a direction from the stem to the bow may be the positive direction. The y-direction may be perpendicular to the bow direction (x-direction), and a direction from the port to the starboard may be the positive direction.

As illustrated in FIG. 2, the x-direction component Vbx(t) and the y-direction component Vby(t) of the horizontal ground speed Vb(t) may be obtained from the following formula, where the drift angle is β(t).

$$Vbx(t)=SOG(t)\cdot\cos\beta(t) \quad \text{(Formula 1)}$$

$$Vby(t)=SOG(t)\cdot\sin\beta(t) \quad \text{(Formula 2)}$$

Here, the drift angle β may be obtained from the ground course COG and the yaw angle ψ by using the following formula.

$$\beta(t)=COG(t)-\psi(t) \quad \text{(Formula 3)}$$

The horizontal ground speed calculating part 70 may calculate a horizontal ground speed Vn(t) in the ENU coordinate system using the following formula.

As illustrated in FIG. 2, the horizontal ground speed Vn(t) in the ENU coordinate system (NED coordinate system) and the horizontal ground speed Vb(t) in the hull coordinate system may have a relation in which the yaw angle ψ(t) is an angle formed by the two coordinate systems. Therefore, the north direction component VnN(t) and the east direction component VnE(t) of the horizontal ground speed Vn(t) in the ENU coordinate system (NED coordinates system) may be calculated from the x-direction component Vbx(t) and the y-direction component Vby(t) of the horizontal ground speed Vb(t) in the hull coordinate system, and the yaw angle ψ(t).

$$VnN(t)=Vbx(t)\cdot\cos\psi(t)-Vby(t)\cdot\sin\psi(t) \quad \text{(Formula 4)}$$

$$VnE(t)=Vbx(t)\cdot\sin\psi(t)+Vby(t)\cdot\cos\psi(t) \quad \text{(Formula 5)}$$

The horizontal ground speed calculating part 70 may output the horizontal ground speed in the ENU coordinate system [Vn(t)=(VnN(t), VnE(t))] to the estimated position calculating part 80.

The estimated position calculating part 80 may calculate an estimated position P(τ) at an estimation time τ using the following method.

At the time t, the following relations may be established between the estimated position P(t)=(Plat(t), Plon(t)) and the horizontal ground speed Vn(t)=(VnN(t), VnE(t)).

$$dPlat(t)/dt=VnN(t) \quad \text{(Formula 6)}$$

$$dPlon(t)/dt=VnE(t) \quad \text{(Formula 7)}$$

Moreover, the yaw angle ψ(τ) at the estimation time may be acquired using the yaw angle ψ(0) at the initial time, and the integration operation of the angular velocity ψ(t) from the initial time t=0 to the estimation time t=τ. Assuming that the ship 100 turns at a constant rate, ω(t) may become a constant value ω from the initial time t=0 to the estimation time t=τ. Therefore, the yaw angle ψ(τ) at the estimation time may be acquired by the following formula.

$$\psi(\tau)=\psi(0)+\omega\cdot\tau \quad \text{(Formula 8)}$$

Moreover, the estimated position calculating part 80 may determine whether the ship 100 is under translation or turning based on the angular velocity ω. The estimated position calculating part 80 may calculate P(τ)=(Plat(τ), Plon(τ)) according to each of the cases.

If the ship is turning or the yaw angle ψ(τ) exceeds a turning detection threshold, the estimated position calculating part 80 may calculate the estimated position P(τ)=(Plat(τ), Plon(τ)) using the integration operations of the estimated position (Formulas 6 and 7).

$$\begin{aligned} Plat(\tau) &= Plat(0) + (\text{integration operation } (VnN)) \\ &= Plat(0) + (VnN(0)\cdot\sin\omega\tau / \\ &\quad \omega - (VnE(0)\cdot(1-\cos\omega\tau))/\omega \end{aligned} \quad \text{(Formula 9)}$$

$$\begin{aligned} Plon(\tau) &= Plon(0) + (\text{integration operation } (VnE)) \\ &= Plon(0) + (VnN(0)\cdot(1-\cos\omega\tau))/ \\ &\quad \omega - (VnE(0)\cdot\sin\omega\tau)/\omega \end{aligned} \quad \text{(Formula 10)}$$

That is, the estimated position calculating part 80 may calculate the estimated position P(τ) using the calculation including the integrated value of the angular velocity which is an acceleration in the turning direction, if the ship 100 is turning.

On the other hand, the estimated position calculating part 80 may calculate the estimated position P(τ) using the following calculation without using the acceleration (angular velocity), if the ship is during the translation, i.e., the yaw angle ψ(τ) is below the turning detection threshold.

$$Plat(\tau)=Plat(0)+VnN(0)\cdot\tau \quad \text{(Formula 11)}$$

$$Plon(\tau)=Plon(0)+VnE(0)\cdot\tau \quad \text{(Formula 12)}$$

The estimated position calculating part 80 may output the calculated estimated position P(τ)=(Plat(τ), Plon(τ)). Moreover, the estimated position calculating part 80 may continuously perform the calculation of the estimated position P(τ) to calculate the estimated positions P(τ) at a plurality of time points τ. Then, the estimated position calculating part 80 may obtain an estimated course by connecting the estimated positions P(τ) at the plurality of time points τ.

By using such a configuration and processing, the course estimating device 10 may reduce the unnecessary use of the acceleration term for calculating the estimated position P(τ), according to the behavior of the ship 100. Therefore, an increase in the error caused by using the acceleration term can be reduced. Therefore, the course estimating device 10 may calculate the estimated position P(τ) with high precision. Further, if positional information of the hull obtained by the inertia sensor, such as a speed sensor or an angular velocity sensor (hull coordinates from the center-of-gravity position) is present, the positional information may be corrected to the center-of-gravity position of the hull based on the attitude angle of the hull, thereby calculating the estimated position P(τ) with higher precision.

Figure 3A:
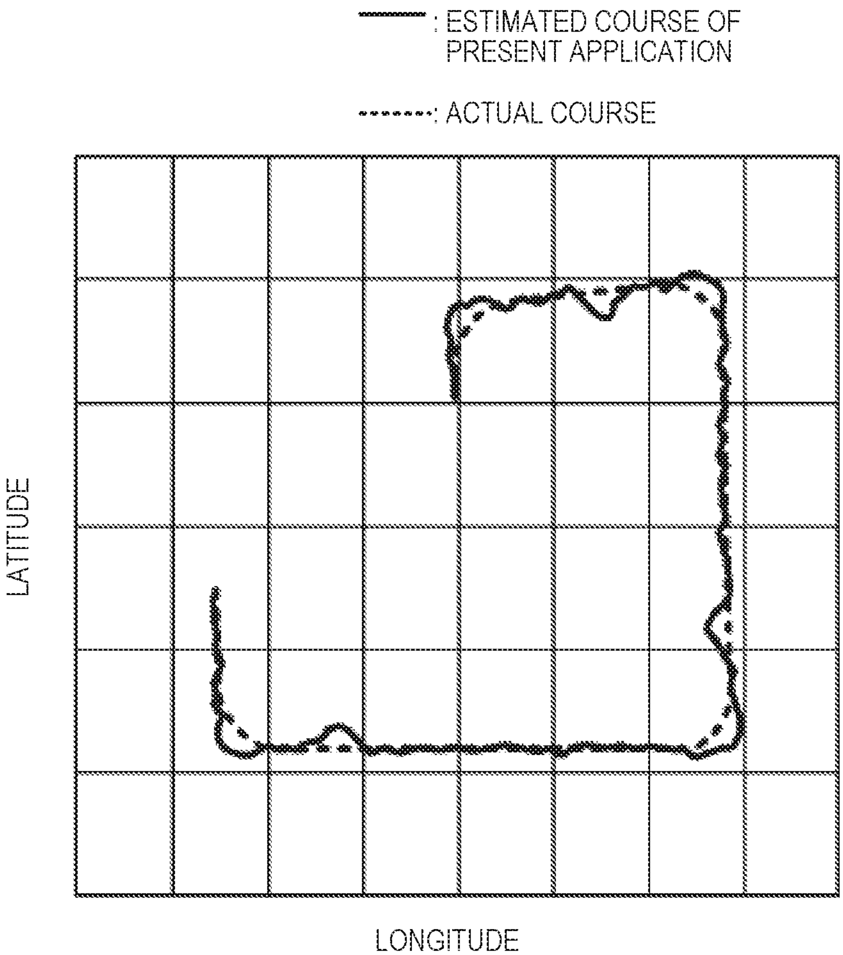
FIGS. 3A to 3D are comparisons of course estimation results of the course estimating device of this embodiment and course estimating devices of comparative examples.
Figure 3B:
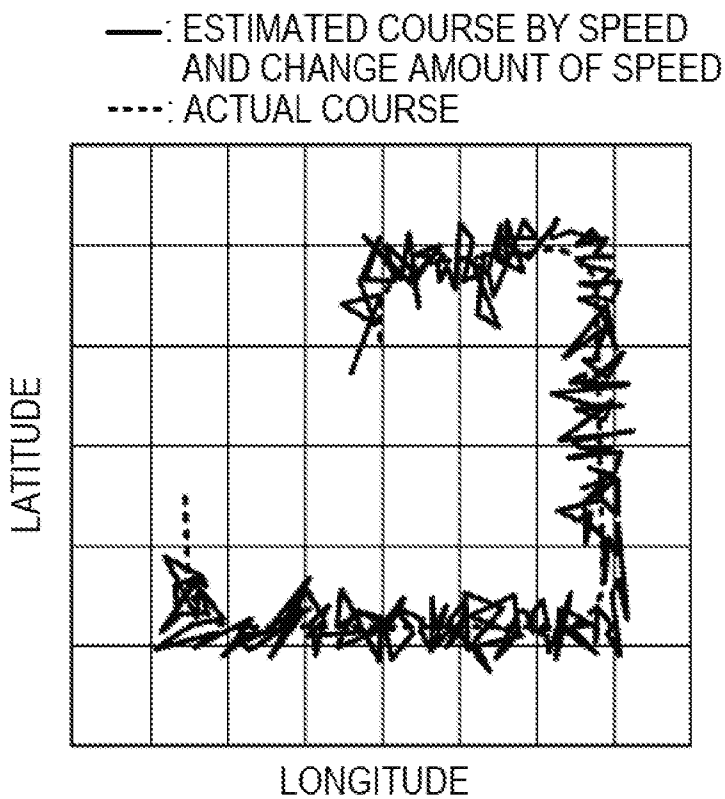
Figure 3C:
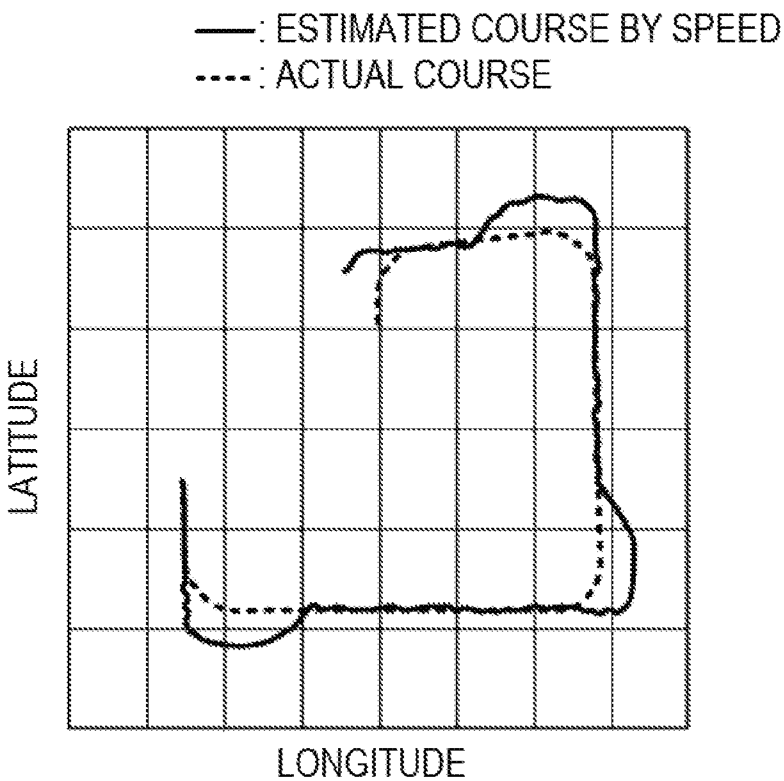
Figure 3D:
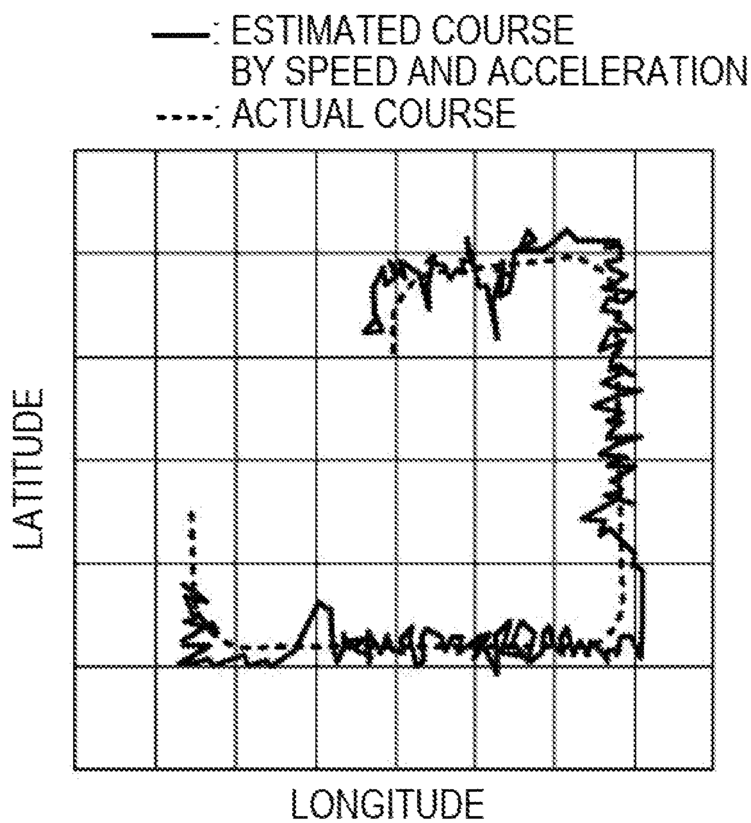

FIGS. 3A to 3D are views of simulations of a course estimation result of the course estimating device of this embodiment and course estimating devices of comparative examples. FIG. 3A illustrates the estimated course by using the configuration of the present application, FIG. 3B illustrates the estimated course by always using the speed and an amount of change in the speed, FIG. 3C illustrates the estimated course by only using the speed, and FIG. 3D illustrates the estimated course by always using the speed and the acceleration. In FIGS. 3A, 3B, 3C, and 3D, broken lines illustrate an actual course, and solid lines illustrate the estimated course.

Figure 4A:
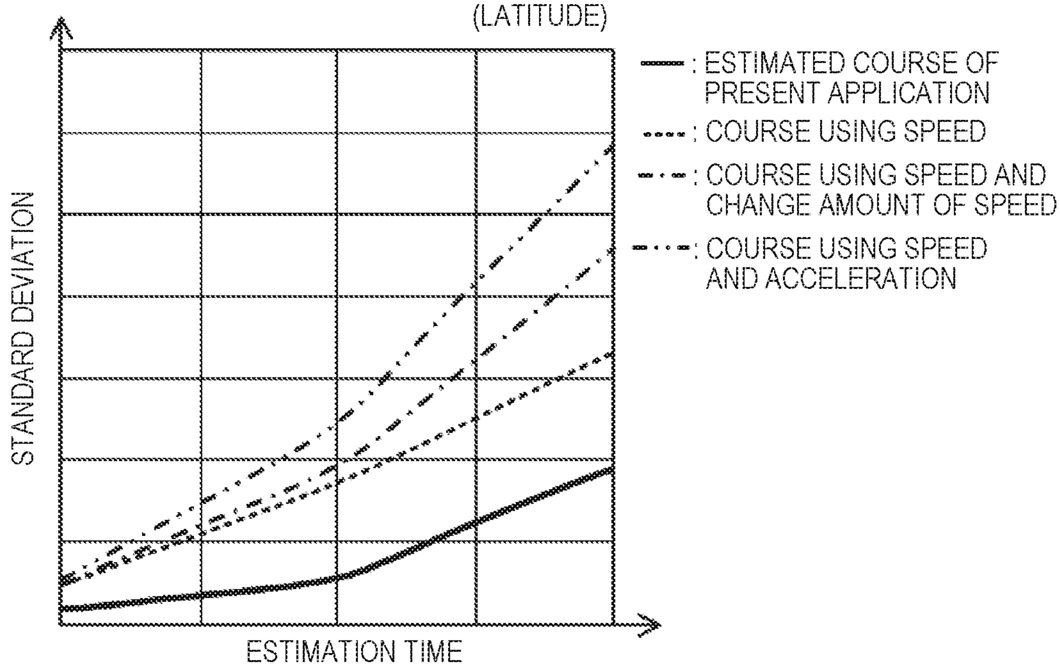
FIGS. 4A and 4B are views illustrating standard deviations of estimated courses to an actual course between the course estimating device of this embodiment and the course estimating devices of the comparative examples.
Figure 4B:
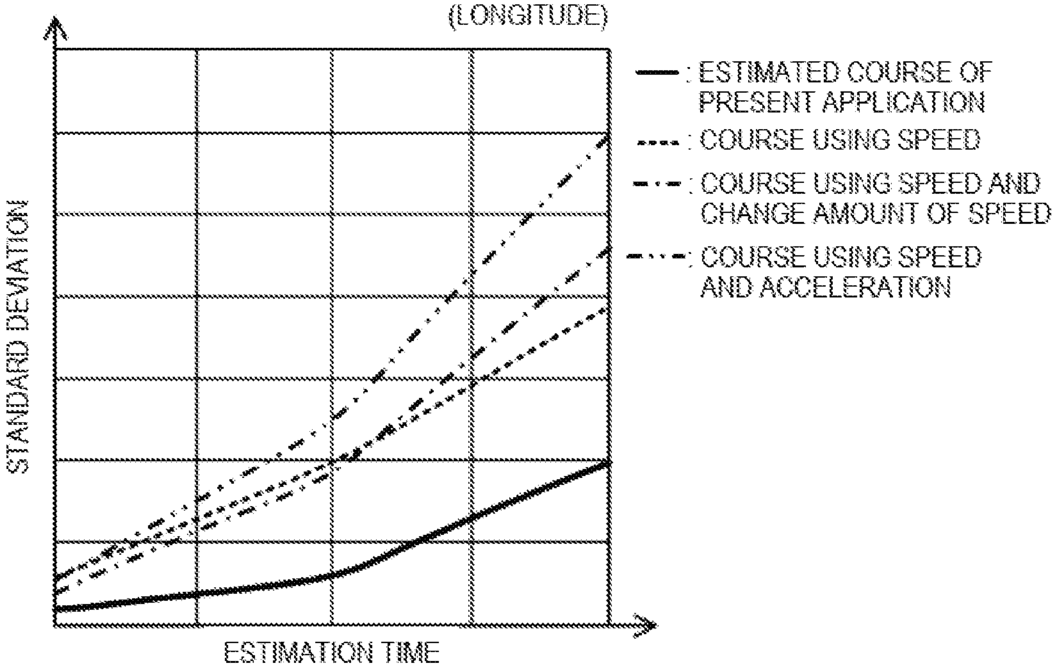

As illustrated in FIGS. 3A, 3B, 3C, and 3D, a difference between the actual course and the estimated course may be reduced by using the configuration of the course estimating device 10 of this embodiment FIGS. 4A and 4B are views illustrating standard deviations of the estimated course to the actual course between the course estimating device of this embodiment and the course estimating devices of the comparative examples. FIG. 4A illustrates the standard deviation of the estimated course in latitude, and FIG. 4B illustrates the standard deviation of the estimated course in longitude. In FIGS. 4A and 4B, a solid line is the standard deviation of the estimated course of the present application, and a broken line is the standard deviation of the estimated course by only using the speed, a one-dot chain line is the standard deviation of the estimated course by always using the amount of change of speed and speed, and a two-dot chain line is the standard deviation of the estimated course by always using the speed and the acceleration.

As illustrated in FIGS. 4A and 4B, the standard deviation of the estimated course may be reduced by using the configuration of the course estimating device 10 of this embodiment. That is, the error of the estimated course to the actual course may be reduced.

Note that in the above description, the mode in which the processings performed by the course estimating device 10 is realized by a plurality of functional parts is illustrated. However, the plurality of processings are programmed and stored in a storage medium, and this program may be read and executed by a processor (which may also be referred to as processing circuitry 100), such as a computer. In this case, the processor may perform processings according to flowcharts illustrated in FIGS. 5 and 6.

Figure 5:
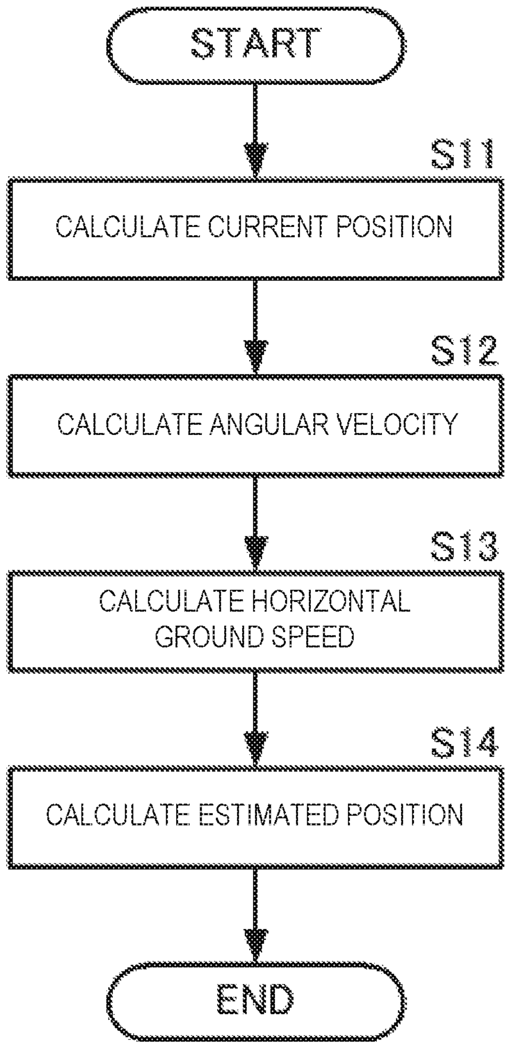
FIG. 5 is a flowchart of course estimation according to the embodiment of the present disclosure.
Figure 6:
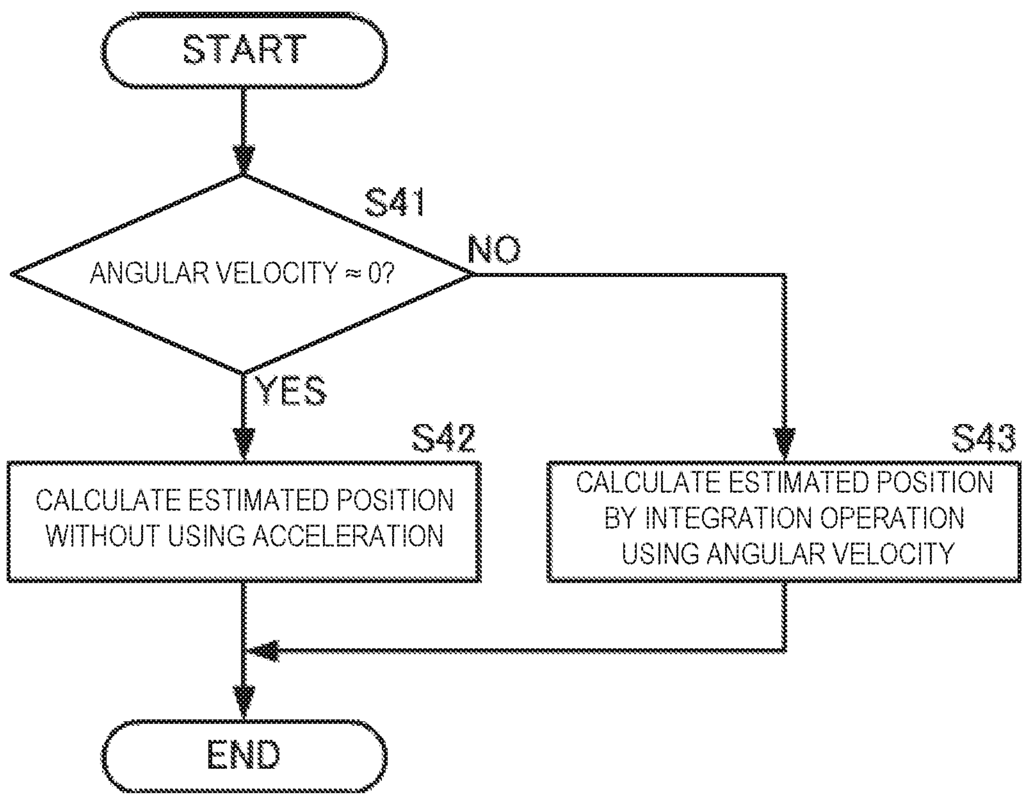
FIG. 6 is a flowchart of a calculation of the estimated position according to the embodiment of the present disclosure.

FIG. 5 is a flowchart of the course estimation according to the embodiment of the present disclosure. FIG. 6 is a flowchart of the calculation of the estimated position according to the embodiment of the present disclosure. Note that, since the concrete realization method of each processing is the same as the processing of each functional part, description thereof is omitted.

As illustrated in FIG. 5, the processor may calculate the current position P(0) (S11). The processor may calculate the angular velocity ω(t) (S12). The processor may calculate the horizontal ground speed Vn using the yaw angle ψ(t) of the attitude angle, the ground course COG(t), and the ground speed SOG(t) (S13). The processor may calculate the estimated position P(τ) using the current position P(0), the angular velocity ω, and the horizontal ground speed Vn(τ) at the estimation time τ(S14).

In detail, as illustrated in FIG. 6, if the angular velocity ω is substantially 0, i.e., if the processor detects that the angular velocity ω is below the turning detection threshold (S41: YES), the processor may calculate the estimated position P(τ) without using the acceleration (S42). If the angular velocity ω greatly differs from 0, i.e., if the processor detects that the angular velocity ω exceeds the turning detection threshold (S41: NO), the processor may calculate the estimated position P(τ) by the integration operation using the angular velocity which is the acceleration in the turning direction (S43).

Figure 7:
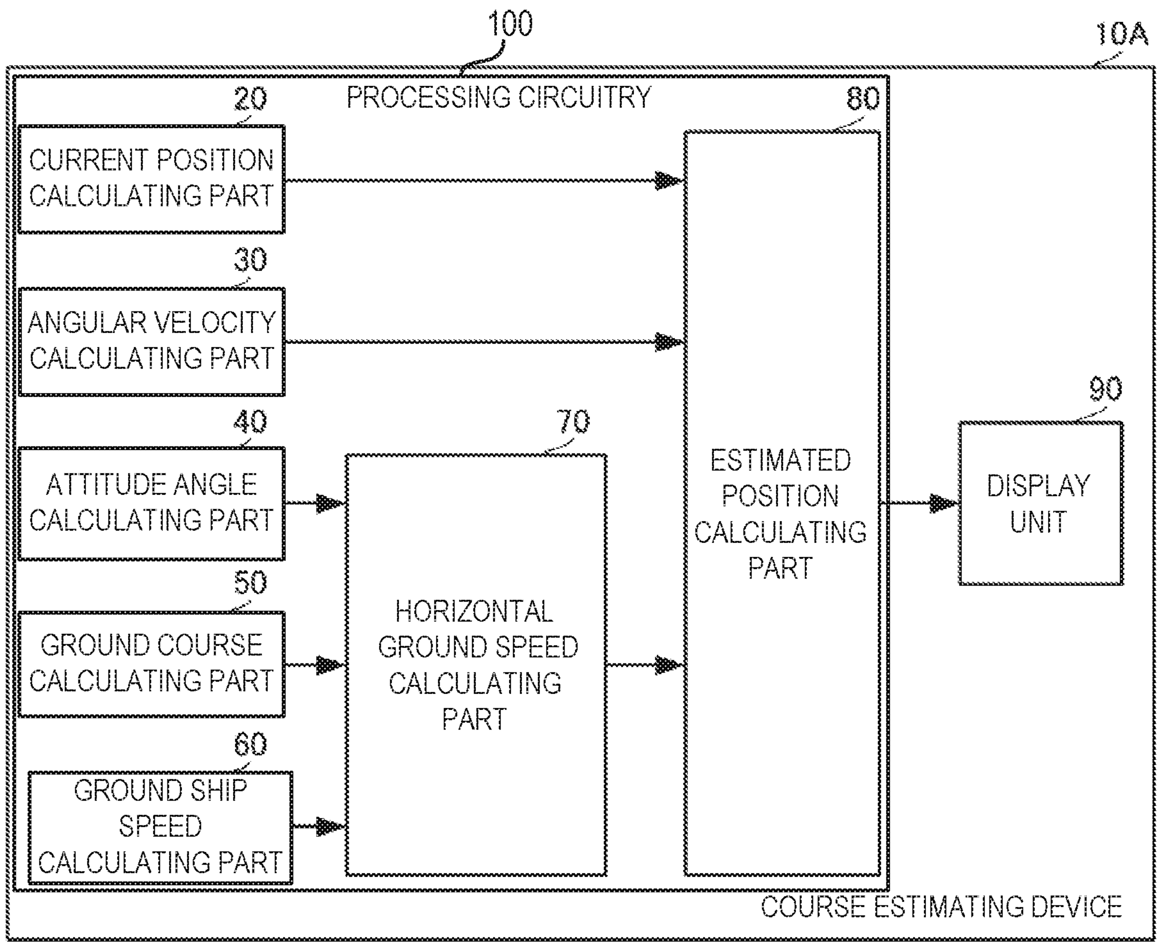
FIG. 7 is a block of a course estimating device according to a second embodiment of the present disclosure.

Next, a course estimating device, a method of estimating the course, and a course estimating program according to a second embodiment will be described with reference to the figure. FIG. 7 illustrates a block of the course estimating device according to the second embodiment of the present disclosure.

As illustrated in FIG. 7, a course estimating device 10A according to the second embodiment of the present disclosure differs from the course estimating device 10 according to the first embodiment in that a display unit 90 is added. Other configurations of the course estimating device 10A are similar to those of the course estimating device 10, and therefore, description of similar parts is omitted.

The estimated position calculating part 80 may output the calculated estimated position to the display unit 90. The display unit 90 may display this estimated position. Moreover, when the estimated course is calculated, the estimated position calculating part 80 may output this estimated course to the display unit 90. The display unit 90 may display the estimated course.

By having such a configuration, an operator can visually recognize the estimated position and the estimated course easily.

Note that the attitude angle calculating part 40, the ground course calculating part 50, and the ground ship speed calculating part 60 may be provided separately from the course estimating devices 10 and 10A. Further, the current position calculating part 20 and the angular velocity calculating part 30 may be provided separately from the course estimating devices 10 and 10A.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A course estimating device, comprising:

processing circuitry configured to:

calculate a horizontal ground speed based on an attitude angle, a ground course, and a ground ship speed of a movable body;

calculate an angular velocity of the movable body; and calculate an estimated position based on a period of time from a current time point to an estimation time point, the horizontal ground speed, and an integration operation of the angular velocity.

2. The course estimating device of claim 1, wherein the processing circuitry is further configured to calculate the estimated position, when the angular velocity exceeds a turning detection threshold.

3. The course estimating device of claim 2, wherein the processing circuitry is further configured to calculate the estimated position without using the angular velocity, when the angular velocity is below the turning detection threshold.

4. The course estimating device of claim 1, wherein the processing circuitry is further configured to calculate the attitude angle using carrier phases of positioning signals.

5. The course estimating device of claim 1, wherein the processing circuitry is further configured to calculate the ground course using carrier phases of positioning signals.

6. The course estimating device of claim 4, wherein the processing circuitry is further configured to calculate at least a yaw angle of the attitude angle.

7. The course estimating device of claim 1, wherein processing circuitry is further configured to calculate the angular velocity using carrier phases of positioning signals or an output of an inertia sensor.

8. The course estimating device of claim 1, wherein processing circuitry is further configured to calculate the estimated positions at a plurality of estimation time points, and calculates the estimated course connecting the estimated positions.

9. The course estimating device of claim 8, comprising a display unit configured to display the estimated position and the estimated course.

10. The course estimating device of claim 2, wherein the processing circuitry is further configured to calculate the attitude angle using carrier phases of positioning signals.

11. The course estimating device of claim 2, wherein the processing circuitry is further configured to calculate the ground course using carrier phases of positioning signals.

12. The course estimating device of claim 10, wherein the processing circuitry is further configured to calculate at least a yaw angle of the attitude angle.

13. The course estimating device of claim 2, wherein processing circuitry is further configured to calculate the angular velocity using carrier phases of positioning signals or an output of an inertia sensor.

14. The course estimating device of claim 2, wherein processing circuitry is further configured to calculate the estimated positions at a plurality of estimation time points, and calculates the estimated course connecting the estimated positions.

15. The course estimating device of claim 14, comprising a display unit configured to display the estimated position and the estimated course.

16. The course estimating device of claim 3, wherein the processing circuitry is further configured to calculate the attitude angle using carrier phases of positioning signals.

17. The course estimating device of claim 3, wherein the processing circuitry is further configured to calculate the ground course using carrier phases of positioning signals.

18. The course estimating device of claim 16, wherein the processing circuitry is further configured to calculate at least a yaw angle of the attitude angle.

19. The course estimating device of claim 1, wherein processing circuitry is further configured to calculate the angular velocity using carrier phases of positioning signals or an output of an inertia sensor.

20. A method of estimating a course, comprising:

calculating a horizontal ground speed based on an attitude angle, a ground course, and a ground ship speed of a movable body;

measuring or calculating an angular velocity of the movable body; and calculating an estimated position based on a period of time from a current time point to an estimation time point, the horizontal ground speed, and an integration operation of the angular velocity.

* * * * *